United States Patent [19]

Kawasaki

[11] Patent Number: 5,301,198
[45] Date of Patent: Apr. 5, 1994

[54] METHOD FOR DEBUGGING A PROGRAM BY EXECUTING A BLOCK MODE RUN

[75] Inventor: Hirokazu Kawasaki, Aichi, Japan

[73] Assignee: Mitsubishi Denki Kabushiki Kaisha, Tokyo, Japan

[21] Appl. No.: 656,274

[22] Filed: Feb. 15, 1991

[30] Foreign Application Priority Data

Feb. 27, 1990 [JP] Japan .................................. 2-46539

[51] Int. Cl.⁵ ............................................. G06F 11/00
[52] U.S. Cl. ........................... 371/19; 395/375; 395/500; 395/800; 364/267; 364/267.91; 364/DIG. 1
[58] Field of Search .............. 371/19; 364/285 MS, 364/267.91, 267 MS; 395/575 MS, 375 MS, 500 MS, 800 MS

[56] References Cited

U.S. PATENT DOCUMENTS

| | | | |
|---|---|---|---|
| 4,312,034 | 1/1982 | Gunter et al. | 364/200 |
| 4,437,184 | 3/1984 | Cook et al. | 371/19 |
| 4,571,677 | 2/1986 | Hirayama et al. | 371/19 |
| 4,636,940 | 1/1987 | Goodwin et al. | 371/19 |
| 4,755,997 | 7/1988 | Takahashi | 371/19 |
| 4,783,762 | 11/1988 | Inoue et al. | 371/19 |
| 5,021,945 | 6/1991 | Morrison et al. | 364/200 |
| 5,021,948 | 6/1991 | Nakayama et al. | 371/19 |

Primary Examiner—Robert W. Beausoliel, Jr.
Assistant Examiner—Phung M. Chung
Attorney, Agent, or Firm—Sughrue, Mion, Zinn, Macpeak & Seas

[57] ABSTRACT

A method for debugging a sequential program, executable by a programmable controller on the basis of input instructions from a programming unit. The program is stored in an intermediate language, converted from a ladder language or a sequential function language input from the programming unit, and may be debugged using several methods. One method involves execution of single instructions starting at a predetermined word and executing an operator-specified number of instruction words. A second method involves a loop-specified process in which a starting word and a subsequent stopping word are identified as well as a number of loops to be executed between the two words; the operation preceding until the loop count is zero. A third method involves a block mode run in which a starting word is identified as the beginning of a run and its end is the last word in the block to which the starting word relates, the end word being automatically identified as a transition between an output instruction and a subsequent input instruction. The number of words from the start word to the end of the block is calculated and used as a basis for determining the extent of the block mode run.

12 Claims, 8 Drawing Sheets

| LADDER LANGUAGE | BLOCK ,402 | STEP ,403 | INTERMEDIATE LANGUAGE ,405 | NUMBER OF WORDS | ·INPUT ·OUTPUT INSTRUCTION ,406 |
|---|---|---|---|---|---|
| X1—MOVP A B / X2 | | | LD X1 | 2 | INPUT |
| | | | OR X2 | 1 | INPUT |
| | | | MOV A B | 5 | OUTPUT |
| X3—SET C / RST D | | | LD X3 | 2 | INPUT |
| | | | SET C | 3 | OUTPUT |
| | | | RST D | 3 | OUTPUT |
| X4 X5 X6—(E) | | | LD X4 | 2 | INPUT |
| | | | AND X5 | 1 | INPUT |
| | | | AND X6 | 1 | INPUT |
| | | | OUT E | 3 | OUTPUT |

METHOD FOR DEBUGGING A PROGRAM BY EXECUTING A BLOCK MODE RUN

BACKGROUND OF THE INVENTION

1. Field of the Invention

The present invention relates to a method for controlling a programmable controller which allows a stepping operation to be performed on the basis of a single ladder block or sequential function program block having input and output steps related to each other in a sequence program.

2. Description of the Prior Art

Figure 3:
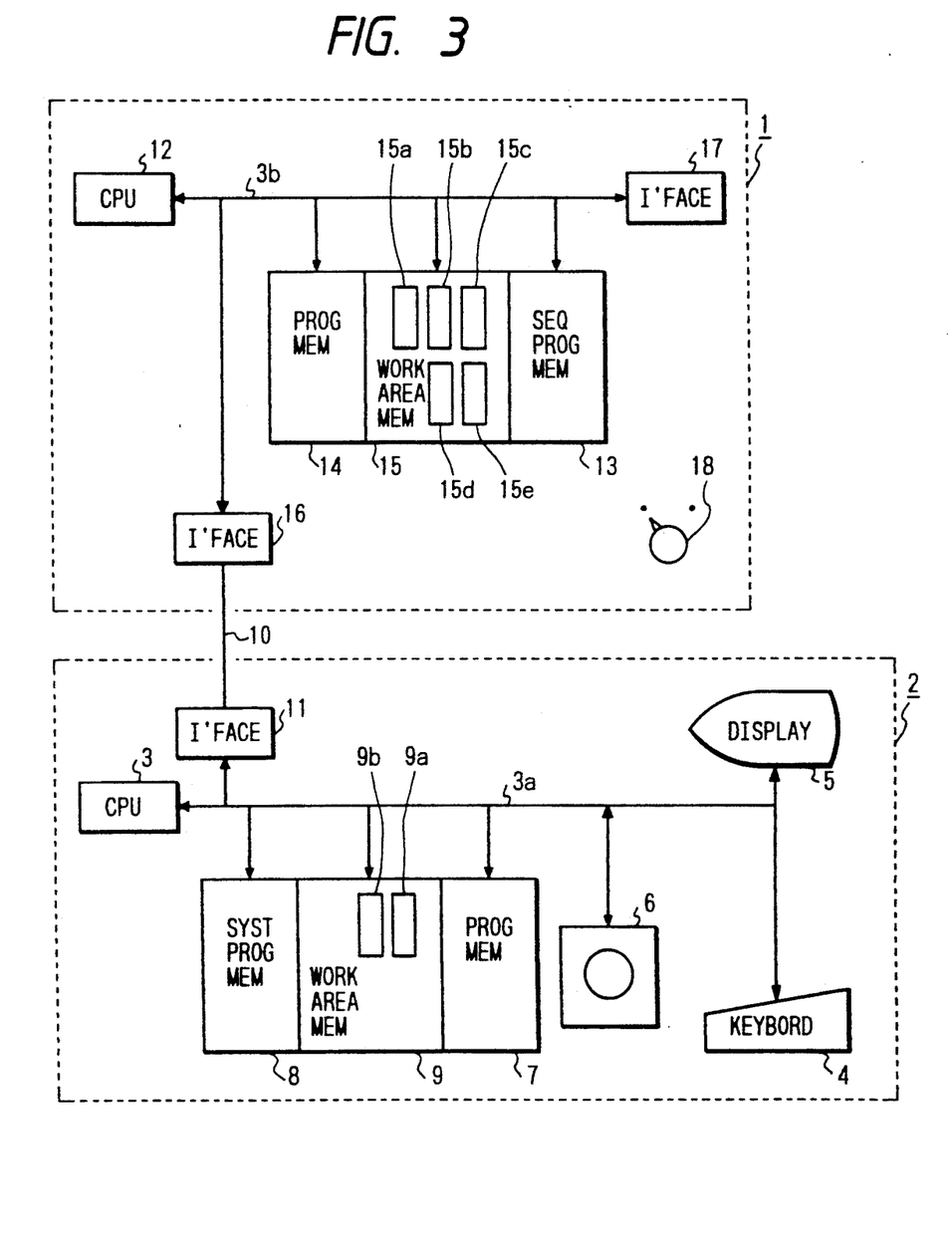
FIG. 3 is a configuration diagram of the conventional programmable controller and the programming unit that employs the present invention.

FIG. 3 is a block diagram showing a programming unit 2 for use with a programmable controller 1 that employs a controlling process known in the art. Referring to FIG. 3, the programmable controller 1 is connected by a cable 10 to a programming unit 2 for writing programs for operating the programmable controller 1. A CPU 3 in the programming unit 2 is connected by a common bus 3a to a keyboard 4, a display device 5, and a floppy disk drive 6. A memory unit comprising programming memory 7 for storing an intermediate language program which has been converted from a ladder language or sequential function program entered from the keyboard 4, system program memory 8 for storing a system program for achieving functions of the programming unit 2 in conjunction with the CPU 3, and a work area memory 9, used when converting the ladder language program into the intermediate language or sequential function program or vice versa, also are connected to the common bus 3a. A starting word number memory 9a is used to store a starting word number as the first word number of a ladder block or sequential function program block in a program written in the intermediate language and stored in the programming memory 7. A table 9b identifies a correspondence between each intermediate language step and the number of words in that step. Memory 9a and table 9b are provided in the work area memory 9. Finally, an interface circuit 11 is connected to the bus 3a in the programming unit 2 and also connects to the cable 10.

A CPU 12 in the programmable controller 1 also is connected to several units by a bus 3b. A memory unit comprising a sequence program memory 13 for storing sequence programs, a system program memory 14 for storing a conversion table for converting a sequence program into a language decodable and executable by the CPU 12 for achieving the desired functions of the programmable controller 1, and a work area memory 15 used by the system program, all connect to the bus 3b. Work area memory 15 includes a stop command word number memory 15a, wherein a stop command word number is stored. The word number specifies the step at which the sequence program stops temporarily, as set by the programming unit 2 in a loop-specified step run described later. Work area memory 15 also includes a loop count memory 15b wherein a loop count, i.e., the number of times the sequence program is executed repeatedly, is set by the programming unit 2 in the loop-specified step run. As described later, the loop count is decremented by 1 every time the sequence program is executed. A stop word number memory 15c for storing a stop word number, i.e., a word number at which the sequence program has stopped temporarily, also is in memory 15 and is used in a single instruction execution stop step run described later. A single instruction execution stop flag memory 15d stores a single instruction execution stop flag that is set by the programming unit 2 when the single instruction execution stop step run is performed and is reset when a temporary stop state is restored in the single instruction execution stop step run described later. A single instruction execution stop words memory 15e stores the number of single instruction execution stop words, i.e., the number of words to be executed, and is set by the programming unit 2 in the single instruction execution stop step run later described. An interface circuit 16 exists between the bus 3b of the programmable controller and the cable 10. Finally, an input/output interface circuit 17 exists between an object to be controlled by the programmable controller (not illustrated) and the bus 3b of the programmable controller 1. A mode select switch 18 is operative to specify either of an ordinary run and a step run, and is particularly useful in selecting a desired run for debugging a sequence program.

In operation, the programmable controller 1 shown in FIG. 3 is designed to cause the sequence program written in an intermediate language stored in the sequence block memory 13 provided in the programmable controller 1 to be read sequentially and executed repeatedly from the first step to the last step. The sequence program is converted into a language processable by the CPU 12, via the system program stored in the system program memory 14, and is executed by the CPU 12.

Figure 4:
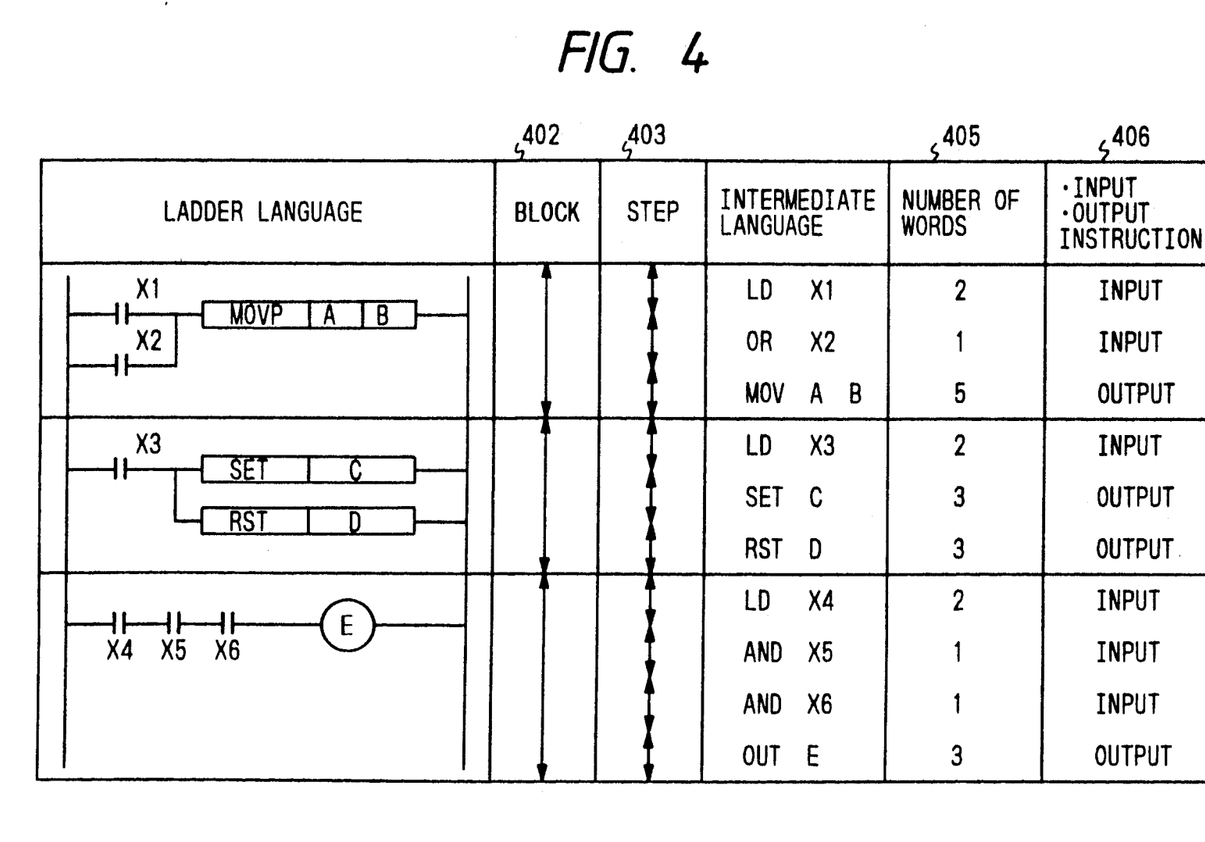
FIG. 4 illustrates a relationship between a ladder language and an intermediate language with which the present invention is concerned.

FIG. 4 lists a relationship between representations of a short sample sequence program, as written in the ladder language and in the intermediate language. In FIG. 4, each arrow in a "Block" column 402 indicates a range of one "ladder block" and the three arrows in that column indicate that the program example in FIG. 4 is comprised of three ladder blocks. Each arrow in a "Step" column 403 indicates a range of "one step" and the ten arrows in that column indicates that the program example in FIG. 4 has a total of ten steps. A "Number Of Words" column 405 contains the number of words required for each intermediate language step, and an "Input/Output Instruction" column 406 indicates that each intermediate language step is an input instruction, if an input step, or is an output instruction, if an output step.

In the program example shown in FIG. 4, the total number of intermediate steps is 10 as described above and the total number of words is 23, as written in the "Number Of Words" column 405. The sequence program memory 13 or the programming memory 7 allows information to be transferred on a word-by-word basis and a word number is provided in the order that each memory area, which can store one word, is accessed.

As shown in column 406 of FIG. 4, a ladder block consists of at least one input instruction and one output instruction. Accordingly, a change from an output instruction to an input instruction occurs at a point where the sequence program shifts from one ladder block to the next.

During debugging of the sequence program it may be necessary to check an operating state of the programmable controller 1 while it is executing a specific step in the sequence program. In that case, the operation of the sequence program is checked by displaying the state of the programmable controller 1 in a "stop step" on the display device 5. The stop step may be conducted after carrying out, via the programming unit 2, a "single instruction execution stop step run". The single instruction run can display the state of the programmable controller 1 at each step while simultaneously advancing the sequence program written in the intermediate language. Alternatively, the stop step check and display may be conducted after executing, via the programming unit 2, a "loop-specified stop step run". The loop-specified run can specify a stop step and the number of times the sequence program is run until a stop is effected at the stop step.

Figure 5:
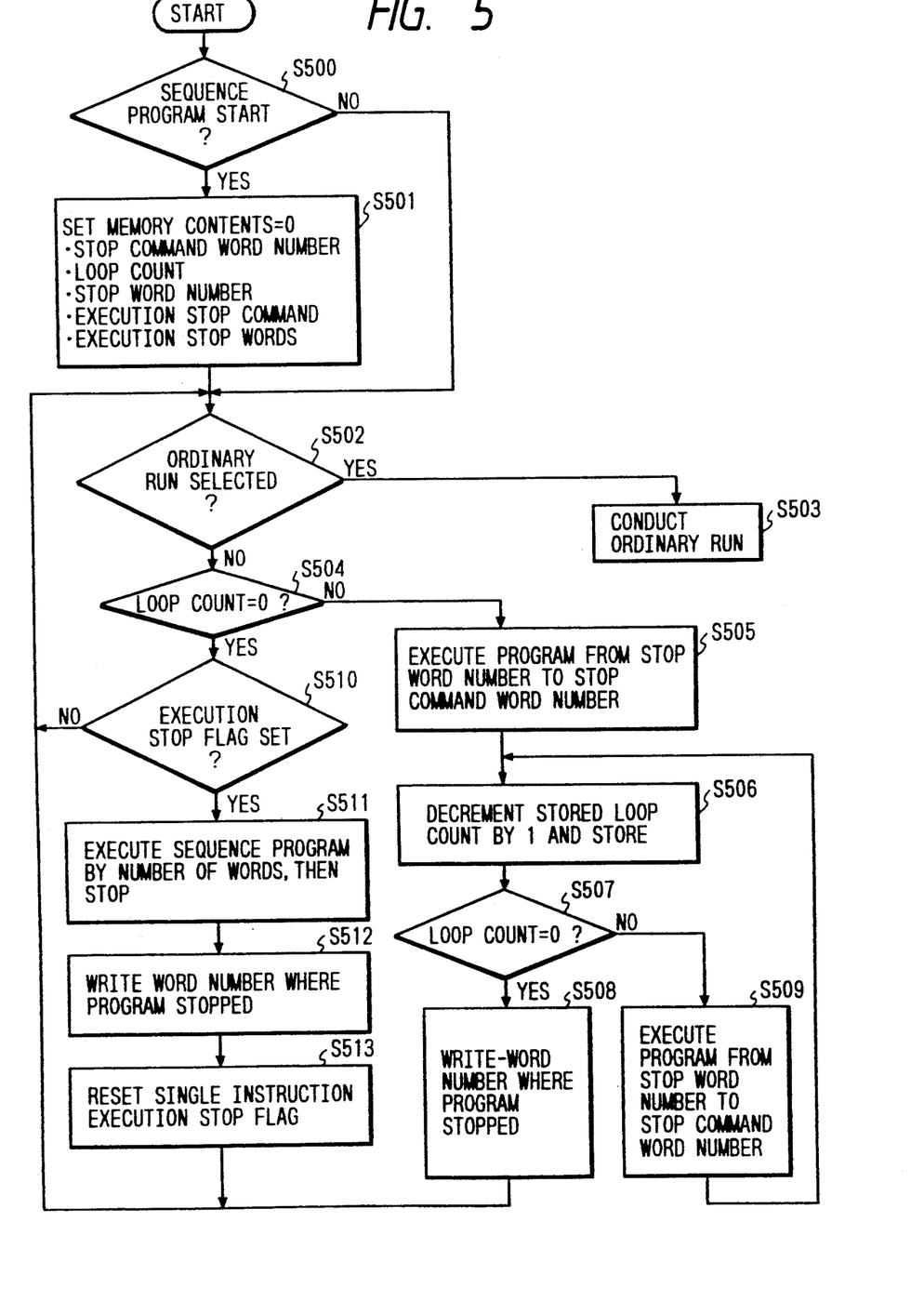
FIG. 5 is an operation flowchart of stop step runs for the conventional programmable controller.

FIG. 5 is an operation flowchart for the programmable controller 1 in conducting both a "single instruction execution stop step run", wherein a temporary stop is effected every time one word of the sequence program is executed in the intermediate language, and a "loop-specified stop step run". In FIG. 5, the sequence program is started and a check of the START condition is made at step S500. If there is a START (YES path), the operation advances to the next step S501 to zero the contents of the stop command word number memory 15a, the loop count memory 15b, the stop word number memory 15c, the single instruction execution stop flag memory 15d and the single instruction execution stop words memory 15e, all of which are provided in the work area memory 15 and employed at later steps in the operation. If the sequence program is not in a START condition (NO path) at the step S500, the operation progresses from the step S500 to step S502. There the condition of the mode select switch 18 is determined.

If at step S502 it is determined that the mode select switch 18 is in an "Ordinary Run" mode position, the operation moves on to step S503 to perform the ordinary run. If the mode select switch 18 is in a "Step Run" mode position, indicating that a debug of the program is to occur, the operation advances to the next step S504 where a determination is made as to whether the loop count is equal to 0.

If the loop count is not zero (NO path) at step S504, it is assumed that the "loop-specified stop step run" has been commanded by the programming unit 2 and the "loop-specified stop step run" operation indicated at steps S505 through S509 is performed. This process accomplishes a debugging on a loop basis. At step S505, the sequence program is executed beginning at the stop word number stored in the stop word number memory 15c and ending at the stop command word number stored in memory 15a, both being sent from the programming unit 2. On completion of the specified program execution, the operation then proceeds to the next step S506.

At the step S506, the loop count stored in the loop count memory 15b is decremented by 1 and the result is rewritten into the loop count memory 15b. The operation then proceeds to the next step S507 where a determination is made of whether the loop count is zero.

If the loop count then stored in the loop count memory 15b is not zero at step S507, the operation returns again to the step S506 via the step S509. At step S509, the sequence program is executed once, starting with the stop word number in memory 15c, and is stopped at the stop command word number stored in memory 15a, both being sent from the programming unit 2.

If the loop count is zero at step S507, the sequence program is assumed to have been executed the predetermined number of times, and the operation advances to step S508. At step S508, the word number at which the sequence program has stopped is written into the stop word number memory 15c and the operation returns to step S502. The operation would then proceed from step S502 to step S504. Since the loop count is zero, the YES path at step S504 is followed to step S510. At step S510, a determination is made of whether the single instruction stop command flag in memory 15d is set. When a loop mode had been prescribed, the flag would not be set.

If at step S510 it is determined that the single instruction execution stop command flag stored in the single instruction execution stop command flag memory 15d has not been set by the programming unit 2, the operation returns to the step S502 and repeatedly executes a loop comprised of the steps S502, S504 and S510 until coming to a temporary stop. When the single instruction execution stop command flag stored in the single instruction execution stop command flag memory 15d is set by the programming unit 2, the operation progresses from the step S510 to step S511 and executes the single instruction execution stop step operation. This would effect a line-by-line debugging operation. At step S511, before the single instruction execution stop command flag in memory 15d is set by the programming unit 2, the sequence program is executed by the number of single instruction execution stop words set in the single instruction execution stop words memory 15e and then comes to a stop. At step S512, the word number at which the sequence program has stopped is written into the stop word number memory 15c, and the operation moves on to the next step S513. At step S513, the single instruction execution stop command flag set in the single instruction execution stop flag memory 15d is reset and the operation returns to step S502. The loop comprised of steps S502, S504 and S510 is then repeatedly executed until coming to a temporary stop.

Figure 7:
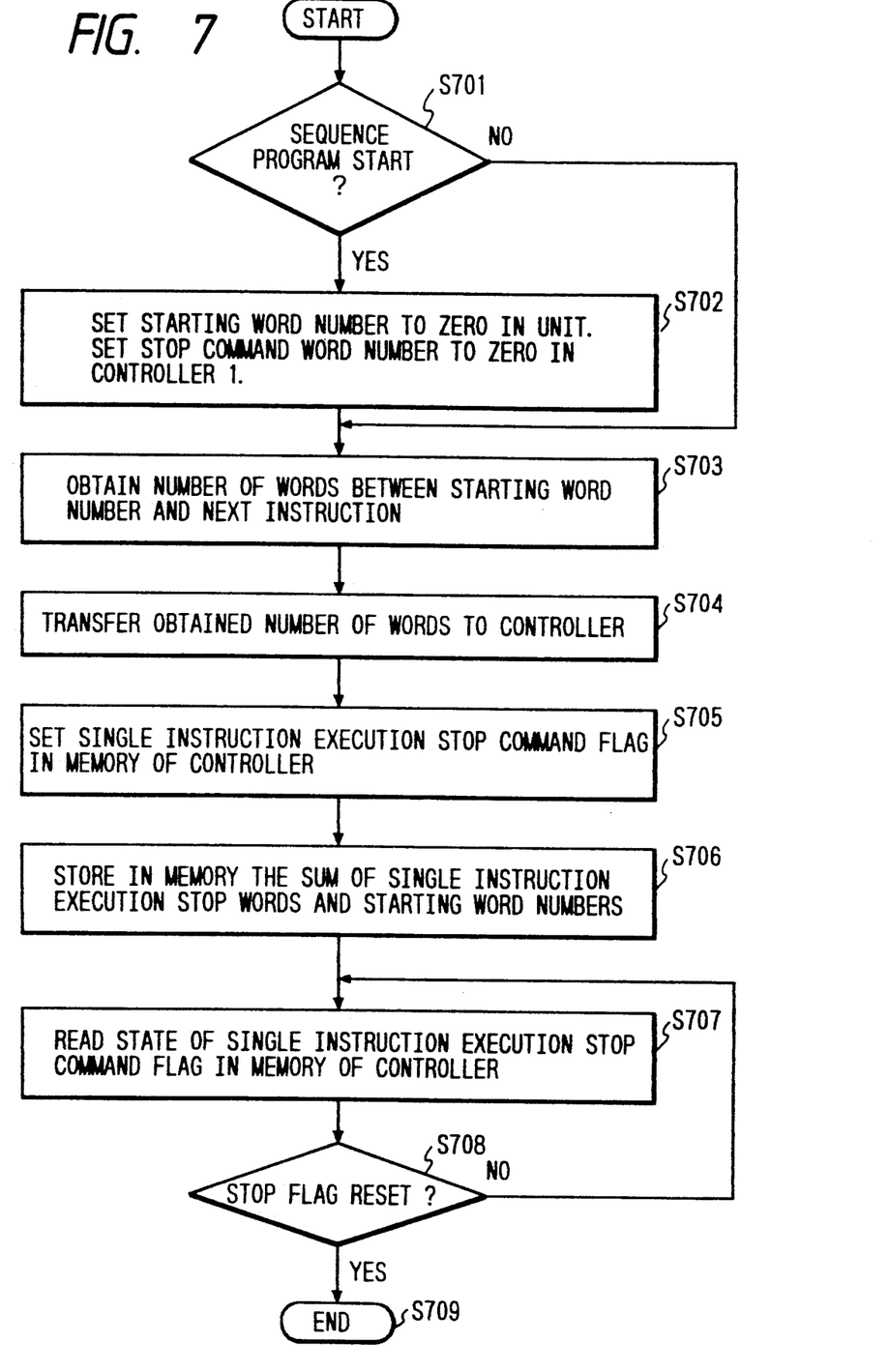
FIG. 7 is a detailed operation flowchart illustrating a conventional single instruction execution stop step run in the flowchart shown in FIG. 6.
Figure 8:
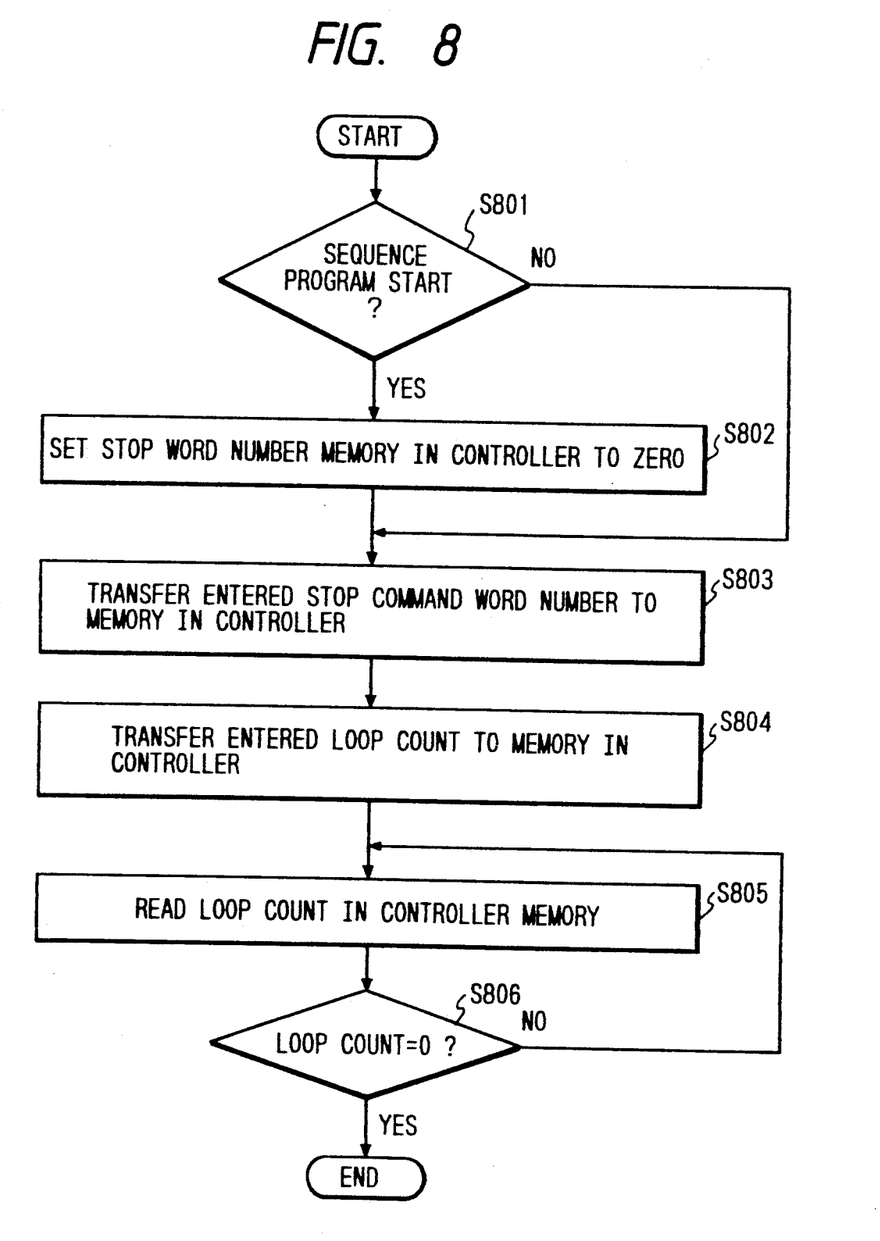
FIG. 8 is a detailed operation flowchart illustrating a conventional loop-specified stop step run in the flowchart shown in FIG. 6.

The corresponding operation of the programming unit 2 during the "single instruction execution stop step run" or the "loop-specified stop step run" will now be described with reference to flowcharts shown in FIGS. 6 to 8.

Figure 6:
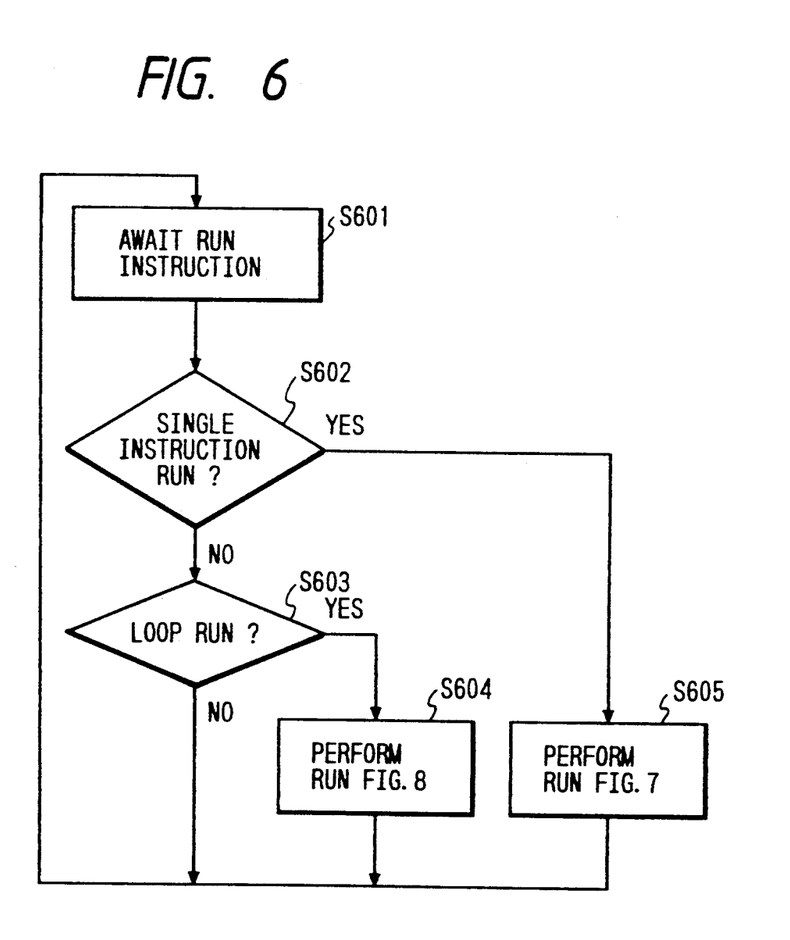
FIG. 6 is an operation flowchart of a conventional programming unit for single instruction and loop runs.

At step S601 shown in FIG. 6, the programming unit 2 is in a state of waiting for an input from keyboard 4, including a run-type command and related word number, loop count etc. When an operator enters a "single instruction execution stop step run" command, the operation progresses to step S602, where a determination is made as to whether the entered command is for a single instruction stop step run. If it is, the YES path is followed and the operation proceeds to step S605, where the single instruction execution stop step run operation of the programming unit 2, as shown in FIG. 7, is performed. Upon completion of that operation, the programming unit 2 returns to the state of waiting for a keyboard input at step S601.

The single instruction execution stop step run operation of the programming unit 2 at the step S605 may be described with reference to the flowchart in FIG. 7. Initially, a check of the START condition is made at step S701. If it is determined that the sequence program is started, the YES path is followed. The operation advances to the next step S702, wherein the starting word number memory 9a provided in the work area memory 9 of the programming unit 2 is cleared and the starting step number stored therein is zeroed. At the same time, the stop word number stored in the stop word number memory 15c provided in the work area memory 15 of the programmable controller 1 is zeroed. The operation then proceeds to step S703.

If it is determined that the sequence program is not started at step S701, the NO path is followed and the operation progresses from step S701 to step S703.

At step S703, the number of words required by an instruction at the next step in the sequence program written in the intermediate language is obtained. The intermediate language instruction/number of words correspondence table 9b, which lists all instructions written in the intermediate language and the number of words required for each instruction in the intermediate language, provides this number.

At step S704, the number of words obtained at step S703 is transferred as the number of single instruction execution stop words to the single instruction execution stop words memory 15e, provided in memory 15 of the programmable controller 1.

At step S705, the single instruction execution stop command flag stored in the single instruction execution stop command flag memory 15d provided in the programmable controller 1 is set. As previously discussed, when it is determined that the single instruction execution stop command flag has already been set at the step S510 shown in FIG. 5, the programmable controller 1 branches to the step S511 and performs the single instruction execution stop step run.

At step S706, the result of adding the number of words obtained at step S703 to the starting word number stored in the starting word number memory 9a is written to the starting word number memory 9a as an updated starting word number to prepare for the next step run.

At step S707, a state of the single instruction execution stop command flag stored in the single instruction execution stop command flag memory 15d of the programmable controller 1 is read. At step S708, if the single instruction execution stop command flag has not been reset, it is assumed that the single instruction execution stop step run has not yet been terminated and the operation returns to the step S707. If it is determined that the single instruction execution stop command flag has been reset at step S708, it is assumed that the programmable controller 1 has terminated the single instruction execution stop step run and the YES path is followed to an END step S709.

At the END step, the operation of step S605 in FIG. 6 will terminate and the operation returns to step S601, where the programming unit 2 again waits for a keyboard 4 input. The steps S707 and S708 are provided to synchronize the operation of the programming unit 2 with that of the programmable controller 1. The single instruction execution stop step run operation of the programmable controller 1 is performed at the steps S511 to S513 shown in FIG. 5.

Operation of the loop-specified stop step run will now be described. When the loop-specified stop step run accompanied by the entry of the stop command word number and the loop count is specified at the step S601 in FIG. 6, i.e., the run instruction is not for a single instruction run, the operation progresses along the NO path from the step S602 to the step S603 and further executes the step S604.

The loop-specified stop step run at the step S604 may be described with reference to the flowchart shown in FIG. 8. In FIG. 8, a determination is made as to whether the sequence program is started at step S801. If started, the operation advances to the next step S802, wherein the stop word number stored in the stop word number memory 15c provided in the programmable controller 1 is zeroed, and the operation proceeds to step S803. If the sequence program is not started at step S801, then the operation progresses from step S801 to the step S803.

At step S803, the stop command word number already entered at the step S601 of FIG. 6 is transferred to the stop command word number memory 15a of the programmable controller 1.

At step S804, the loop count already entered at the step S601 shown in FIG. 6 is transferred to the loop count memory 15b of the programmable controller 1. If the loop count set in the loop count memory 15b of the programmable controller 1 is not zero, the operation branches to the step S505 at the step S504 shown in FIG. 5 and performs the loop-specified stop step run operation.

At step S805, the loop count stored in the loop count memory 15b of the programmable controller 1 is read, and if the loop count is not zero at step S806, the operation returns again to the step S805. If the loop count is zero at the step S806, it is assumed that the loop-specified stop step run is complete in the programmable controller 1 and the operation terminates the step S604 of FIG. 6, returns to the step S601, and the programming unit 2 waits for another keyboard input. The steps S805 and S806 are provided to synchronize the programmable controller 1 and the programming unit 2. The loop-specified stop step run operation of the programmable controller 1 is performed at the steps S505 to S509 shown in FIG. 5.

A conventional operation for debugging the sequence program will now be described.

Since the sequence program provides an output condition in correspondence with an input condition in each block, it is not always useful to determine the operating state of the programmable controller 1 at steps into which the blocks have been subdivided. Therefore, the sequence program is best debugged by repeating the single instruction execution stop step run until the run progresses to a step delimiting one block, or by performing the loop-specified stop step run which is accompanied by the entry of the stop command word number and the loop count. To obtain the stop command word number required for the loop-specified stop step run, it is necessary to show the sequence program on the display or output it on a printer. Hence, the debugging operation is troublesome for a per block run.

The conventional controlling method has only the above described single instruction execution stop step run and loop-specified stop step run as step run modes. When performing a step run on the basis of a single block, which includes input and output instructions related to each other, it is necessary to repeat the single instruction execution stop step run or carry out the loop-specified stop step run. This requires the entry of the loop count and the calculation and entry of the stop word number. This poses problems such as operator error in the required calculation and key operations, and presents a practical difficulty in efficiently debugging the sequence program.

SUMMARY OF THE PRESENT INVENTION

It is, accordingly, an object of the present invention to overcome the disadvantages in the conventional process by providing a process for controlling a programmable controller which ensures ease of key operation and sequence program debugging in conducting a step run on a single block basis.

A method for controlling a programmable controller concerned with the present invention comprises: a step of storing into a sequence program memory beforehand a sequence program for first executing input steps together on the basis of a single block having input and output steps related to each other and then executing the output steps together; and a step of reading the sequence program from the sequence program memory, executing the sequence program in order, and temporarily stopping the sequence program at a point where an output step is switched to an input step, when a single operation command for temporarily stopping the sequence program after executing the single block is entered.

In a single block operation stop run according to the present invention, when a single block operation command is entered, the sequence program is run and temporarily stopped at each point where the program advances from an output step to an input step, representing the termination point of each block.

DESCRIPTION OF THE PREFERRED EMBODIMENT

One embodiment of the present invention will now be described with reference to FIGS. 1 to 3 and 5. Structures of a programmable controller 1 and a programming unit 2 to which one embodiment of the present invention applies are identical to those shown in FIG. 3, and operation of the programmable controller 1 is the same as that in the flowchart shown in FIG. 5.

Figure 1:
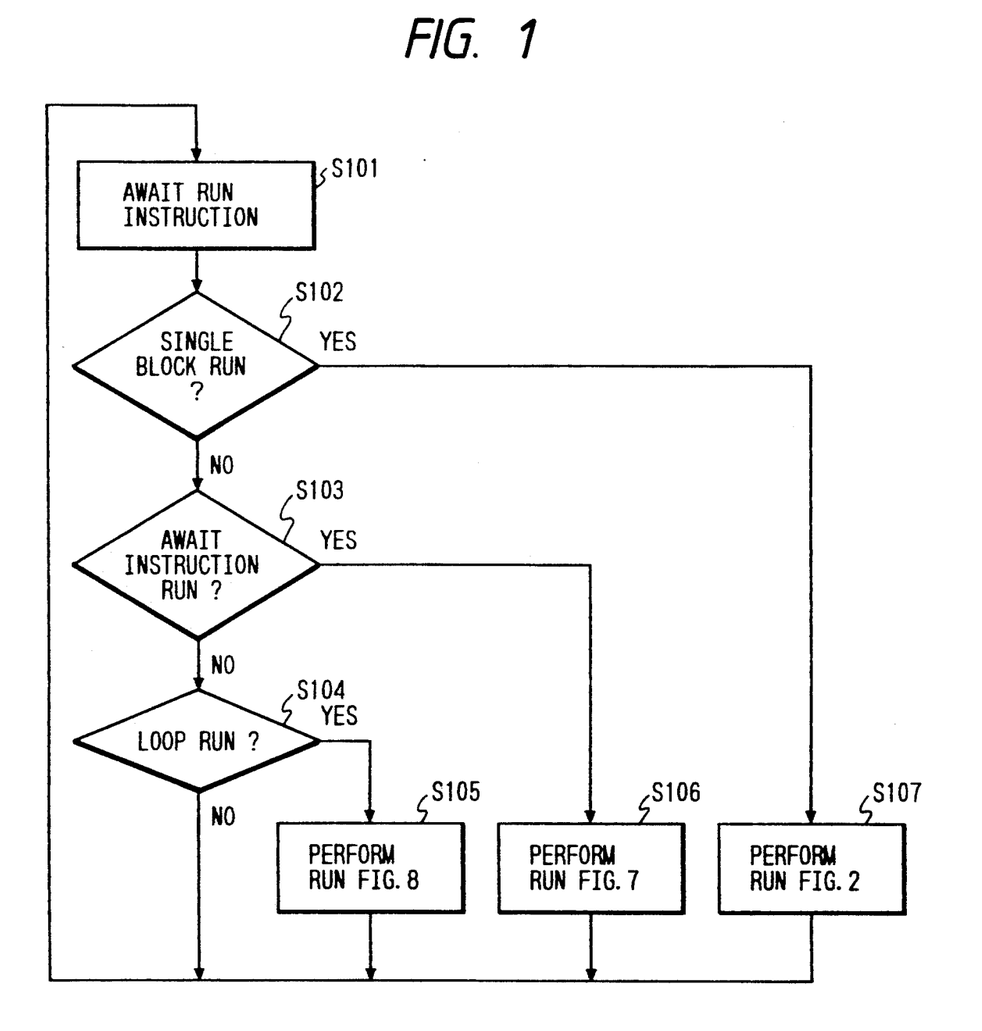
FIG. 1 is an operation flowchart of a programming unit for step runs illustrating a programmable controller controlling method according to one embodiment of the present invention.

FIG. 1 is similar to FIG. 6 in illustrating the conventional techniques, but differs with the use of steps S102 and S107. When the programming unit 2 is waiting for a keyboard 4 input at step S101, entry of a single block operation command, e.g., single block stop command together with an identification of a starting word number, advances the operation from the step S102 to step S107 and causes a single block stop step run, shown in FIG. 2, to be performed.

Figure 2:
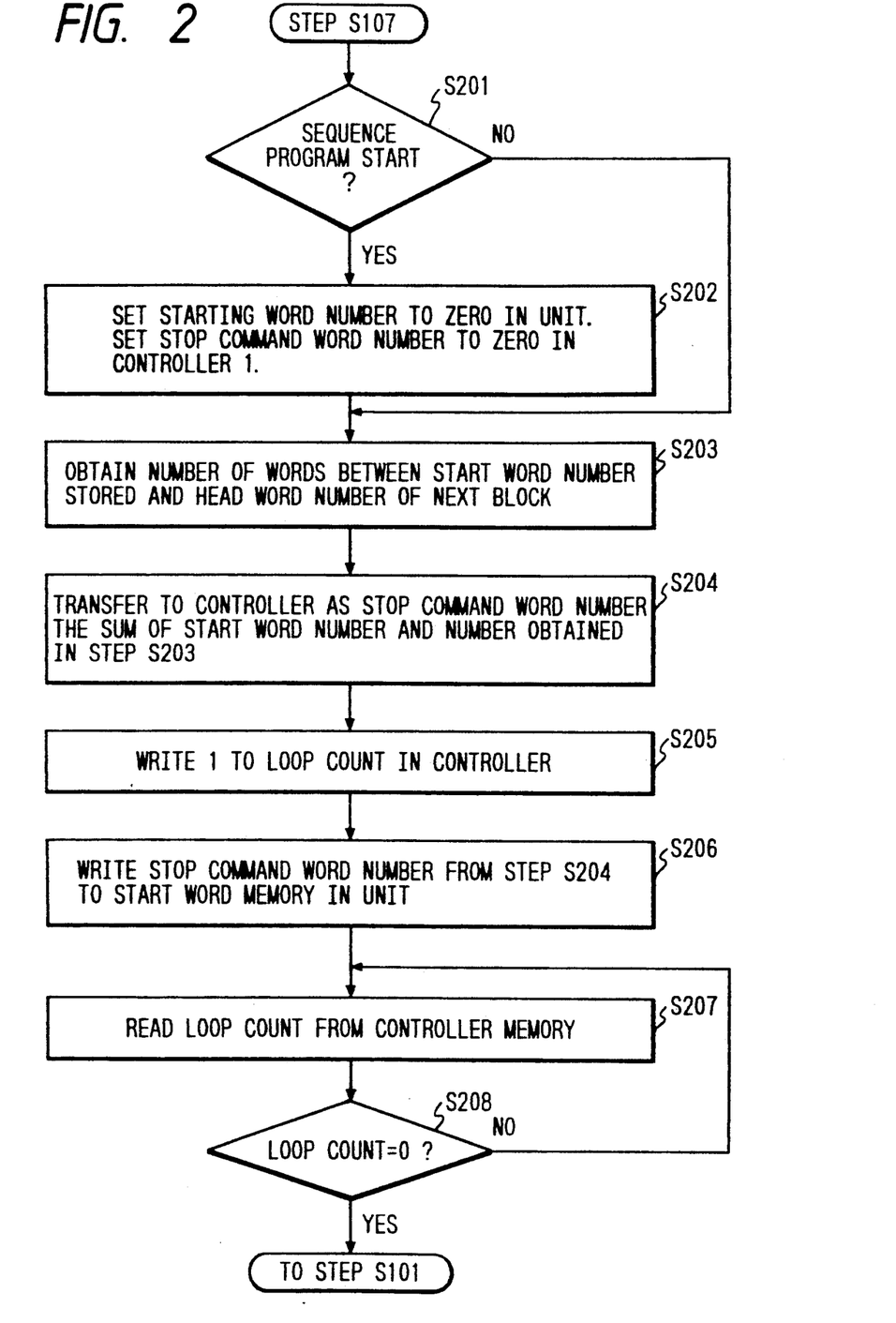
FIG. 2 is a detailed operation flowchart of a programming unit illustrating a single ladder block stop run in the flowchart shown in FIG. 1.

Referring to FIG. 2, a determination is made as to whether a sequence program is started at step S201. If started (YES path), a starting word number stored in a starting word number memory 9a of the programming unit 2 is zeroed and a stop command word number stored in a stop command word number memory 15a of the programmable controller 1 is zeroed at step S202. The operation then proceeds to step S203. If at step S201, it is determined that the sequence program is not started (NO path), then the operation progresses directly from the step S201 to step S203.

At step S203, the number of words between the starting word number stored in the starting word number memory 9a and a head word number of the next block is obtained by causing the CPU 3, operated in accordance with a system program stored in the system program memory 8, to count the number of words up to a point where an output instruction is switched to an input instruction in the sequence program written in an intermediate language. In the above description of the step S203, one block starts with the starting word number and ends when an output instruction is switched to an input instruction, and the next block starts with the input instruction to which the output instruction has been switched.

At step S204, the result of adding the starting word number stored in the starting word number memory 9a to the number of words obtained at the step S203 is transferred as a stop command word number to the stop command word number memory 15a provided in the programmable controller 1.

At step S205, 1 is written to the loop count memory 15b provided in the programmable controller 1 to set the loop count to 1.

At step S206, the stop command word number obtained at the step S204 is written to the starting word number memory 9a to prepare for the next step run.

At step S207, the loop count stored in the loop count memory 15b provided in the programmable controller 1 is read, and if the loop count is not zero at step S208, the operation returns to step S207. If the loop count is zero at the step S208, the operation terminates the single block stop step and returns from the step S107 shown in FIG. 1 to the step S101, and the programming unit 2 waits for the keys of keyboard 4 to be pressed again.

In other words, the number of words from the starting word number to the point where the output instruction is switched to the input instruction is obtained at the step S203 by causing the CPU 12 to count the same. Then, the sum of the number of words and the start word number is transmitted to the programmable controller 1 as a stop command word number at step S204. The contents of the loop count memory 15b of the programmable controller are set to 1 at step S205. Since until this time the content of the loop count memory 15b is zero, the mode select switch is not in the ordinary run mode position but in the step run mode position, there is no one-instruction execution stop run command, and the one-instruction execution stop flag has been reset, the programmable controller 1 will operate in a sequence of step S502 to step S504 to step S510 to step S502, in FIG. 5.

However, when the contents of the loop count memory 15b is changed to 1, the operation progresses from step S504 to step S505, in FIG. 5. The programmable controller 1 then executes the sequence program, at the step S505, up to the stop command word number which was transmitted by the programming unit 2, zeros the contents of the loop count memory 15b at step S506, progresses to step S507, step S508 and step S502, and operates again in the sequence of step S502 to step S504 to step S510 to step S502, and comes to a temporary stop.

The steps S207 and S208 are provided to synchronize the programmable controller 1 and the programming unit 2, and the operation of the programmable controller 1 is performed at the steps S505 to S508 shown in FIG. 5.

It will be appreciated that the single instruction execution stop step run may be automatically repeated by the number of words up to the head word number of the next block obtained in a similar manner to that of the preferred embodiment of the present invention.

It will be also appreciated that the programming unit and the programmable controller may be combined into one structure.

It will be apparent that the invention, as described above, achieves a highly efficient programmable controller controlling process which ensures ease of step runs in program debugging because the process includes a single ladder block or sequential function program block stop run facility for temporarily stopping a sequence program at a point where an output instruction is switched to an input instruction.

I claim:

1. A process of debugging a sequence program run by a programmable controller, having a sequence program memory, comprising of the steps of:
    storing in a sequence program memory a sequence program, comprising successive input and output steps, said steps being organized in blocks, each single block defined to begin with an input step and to end with an output step that is next succeeded by an input step of a subsequent block;
    reading said sequence program from said sequence program memory;
    for debugging a single subject block, executing together all successively occurring input steps within said subject block and then executing together all successively occurring output steps within said subject block; and
    temporarily stopping said sequence program at a transition point where an output step of said subject block ends and an input step of said subsequent block begins, when a single operation command for temporarily stopping said sequence program after executing said subject block is entered.

2. The process of claim 1 further comprising the steps of:
    identifying a starting word in said subject block for starting said execution step; and
    automatically identifying said transition point in said sequence program where said output step of said subject block is changed to said input step of said subsequent block.

3. The process of claim 2, further comprising the steps of:
    calculating a number of words between said starting word and said transition point; and
    using said calculated number of words to identify the point when said program execution is temporarily stopped.

4. In a system comprising a programming unit for use with a programmable controller, operable to execute a sequence program comprising plural input and output instructions, each instruction comprising at least one word, at least one of said input instructions and at least one succeeding output instruction defining a block, a method for debugging said sequence program comprising:
    selecting a word in an input instruction as a start point word for a subject block,
    identifying a subsequent output instruction in said subject block that next precedes an input instruction in a subsequent block;
    determining a number of instruction words between said start point word and the end of said subsequent output instruction, and
    executing a portion of said sequence program corresponding to said subject block to debug said block, beginning with said start point word and ending at the end of said subsequent output instruction.

5. The method of claim 4, further comprising:
    assigning a number to each instruction word for identifying said instruction word's sequence of occurrence in a subject block,
    adding to the assigned number of said start point word the number of instruction words between said start point word and the end of said subsequent output instruction and identifying the sum thereof as stop point word number, and
    using said stop point word number to identify the end of said subsequent output instruction.

6. The method of claim 4, further comprising:
    synchronizing the operation of said programmable controller and said programming unit by storing a loop count in said controller and reading said loop count by said programming unit.

7. A method of checking and debugging a sequence program written for a programmable controller and having a plurality of sequentially occurring instructions comprising:
    loading a sequence program into a sequence program memory,
    selecting one of a plurality of debugging modes comprising a block run mode and at least one of a single instruction step run mode and a loop step run mode,
    upon selection of a block run debugging mode, detecting start and end points of a block by selecting a first input instruction as a starting point and by selecting an output instruction just preceding a next occurring input instruction as an end point; and
    performing debugging by executing a portion of said sequence program from said start point to said end point.

8. The method of claim 7, further comprising the steps of selecting said block run mode, determining a number of words between said start and end points, and using said determined number of words to control said executing step.

9. The method of claim 8 wherein said sequence program is originally written in one of a ladder language and a sequential function chart language, each having a plurality of instructions, each instruction comprising a block.

10. The method of claim 9 wherein said sequence program is stored in an intermediate language, comprising at least one load instruction and one said output instruction.

11. The method of claim 7 comprising selecting said single instruction step run mode and automatically repeating said mode until said end point.

12. The method of claim 8 further comprising, after completion of a first block run, identifying a first word of a next subsequent instruction as a next starting point and preceding with a second block run.

* * * * *